Nov. 2, 1965  W. R. SIMONS  3,214,980

GYROSCOPES

Filed Oct. 31, 1960

INVENTOR:
W. R. SIMONS
BY: Moore & Hall
ATTORNEYS.

United States Patent Office 3,214,980
Patented Nov. 2, 1965

3,214,980
GYROSCOPES
William Richard Simons, Cheltenham, England, assignor to Smiths America Corporation, Lakeland, Fla.
Filed Oct. 31, 1960, Ser. No. 66,171
Claims priority, application Great Britain, Nov. 4, 1959, 37,409/59
8 Claims. (Cl. 74—5)

The present invention relates to gyroscopes and is particularly concerned with rate gyroscopes, that is to say gyroscopes which are mounted in a single gimbal structure for precession only about a first axis normal to the spin axis of the rotor of the gyroscope motor and precess in operation through an angle dependent on the rate of rotation of the gyroscope as a whole about a second axis normal to both the spin axis and the first axis. Commonly, rate gyroscopes include a restraining spring arrangement which acts to exert a restraining torque about the first axis on the gimbal structure, the torque being dependent on and in opposition to precession in either direction about the first axis. The restraining spring arrangement may, for example, take the form of one or more torsion bars which lie along the first axis and are twisted on rotation of the gimbal structure about the first axis, or some arrangement of a helical or leaf spring or springs which is disturbed on rotation of the gimbal structure about the first axis. In any case, the restraining spring arrangement is such that, at least for small angles of rotation, the relation between deflection about the first axis and the rate of rotation of the gyroscope about the second axis is approximately linear.

If some form of pick-off is provided to generate an electric signal dependent on the angle of rotation about the first axis, this signal will vary with, and can be made proportional in amplitude to, the rate of rotation of the gyroscope about the second axis.

It is known, in rate gyroscopes, to mount the gimbal structure for rotation in the required manner about the first axis within a fluid tight casing, the weight of the gyroscope motor and the gimbal structure being wholly or partially supported by a body of liquid within the fluid tight casing. This has advantages in that it relieves the bearings or other mountings provided for the gimbal structure of part, at least, of the weight. In addition, the liquid serves to damp the motion of the gimbal structure about the first axis and also acts, to a certain extent, as a cushion against shocks.

Difficulties arise, however, in that the known fluids which are of sufficiently high density to enable them to support the entire weight of the gyroscope motor and gimbal structure, usually have a comparatively high viscosity/temperature variation and in some cases even tend to solidify at temperatures within, for example, the operating temperature range of aircraft equipment. It is thus necessary to provide some form of heater and temperature control system which can be an undesirable complication where compactness and/or reliability of operation are required. Such liquids are, for example, the chlorofluorocarbon oils.

For this reason somewhat less dense fluids, such as the so-called "silicone fluids," have been employed, these having less variation of viscosity with temperature but having a density such that the gimbal structure is only partially buoyant. The remaining support required has been provided in some cases by supporting the gimbal structure at either end by torsion bars lying along the first axis or by providing ball bearings at one or both ends instead of or in addition to the torsion bars or bars. Where only torsion bars are used, their lateral stiffness is small if the torsional stiffness is made small enough to allow measurement of small rates of rotation about the second axis. If one or more bearings are provided, the weight they have to support causes the frictional resistance to be high so that measurement of very small rates of rotation, such as 0.005°/second or less, is difficult.

These difficulties are increased where it is required to construct rate gyroscopes of small dimensions, for example having overall dimensions that are a small number of inches, and sensitive to rates of rotation ranging from very small values up to rates of a few degrees per second.

According to the present invention a rate gyroscope comprises a gyroscope motor having a rotor mounted for rotation about its axis of spin in a gimbal structure which is itself mounted within a fluid-tight casing for rotation about a first axis normal to the rotor spin axis and is partially supported by a liquid within the casing, a restraining spring arrangement which, in addition to exerting a restraining torque on the gimbal structure about the first axis, supports a part of the weight of the gimbal structure (and that which is supported by the gimbal structure) and a low friction bearing surrounding, but normally spaced from, a part which has circular symmetry about the first axis, of an external surface of the gimbal structure or an extension thereof, the spacing of the bearing from the surface part being such as to prevent excessive motion of the gimbal structure relative to the casing in directions normal to the first axis.

Preferably, apart from the support provided by the liquid, the gimbal structure is supported within the fluid-tight casing between two torsion bars the longitudinal axes of which are co-incident with the first axis, these bars acting as the restraining spring arrangement in addition to supporting the gimbal structure. In such a case, a low friction bearing may be provided at or near the attachment of each torsion bar to the gimbal structure. In another case, only one such torsion bar may be provided, an axial extension of the gimbal structure at the end opposite the one torsion bar, being supported by a low friction bearing, such as a ball bearing, carried by the casing. The gimbal structure may, if necessary, itself include a fluid tight casing for the gyroscope motor.

The low friction bearings provided for the prevention of excessive motion of the gimbal structure are preferably ball-bearings but other bearings, such for example as journal bearings lined with a material having a very low co-efficient of friction, for example polytetrafluoroethylene, may also be used. The spacing measured radially, will vary from case to case but may for example be of the order of 0.0005 to 0.003 inch.

An example of a rate gyroscope according to the present invention will now be described with reference to the accompanying drawing in which.

Figure 1:
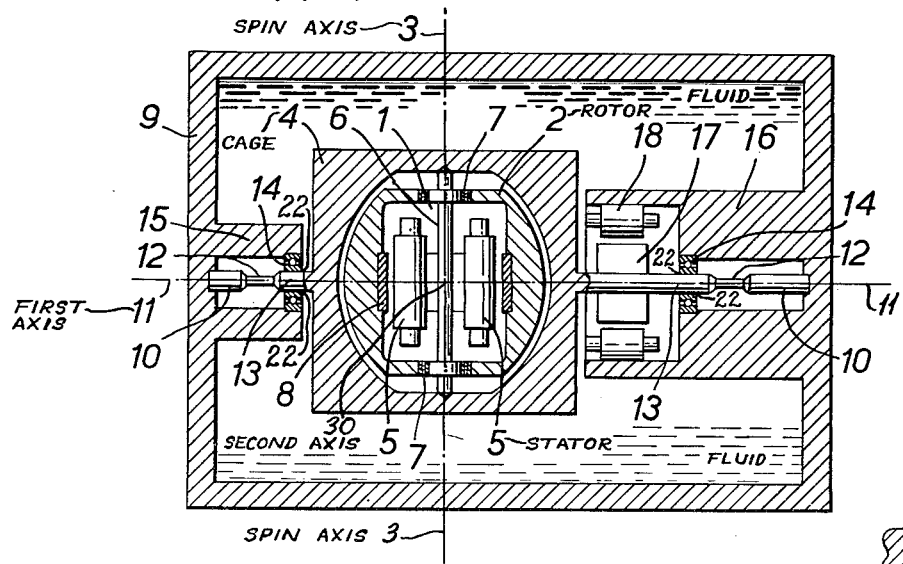
FIGURE 1 shows a diagrammatic sectional view of the gyroscope.

Referring to FIGURE 1 a gyroscope motor 1 which is a conventional three phase alternating current hysteresis motor, has a rotor 2 which is mounted for rotation about its spin axis 3 in a gimbal structure 4 which carries a three phase stator winding 5. The rotor 2 is supported relative to the stator shaft 6 by ball bearings 7, the whole structure being indicated only diagrammatically in the drawing. As shown, the rotor 2 which may be of brass for example, is provided with a driving ring 8 of for example cobalt steel. Electrical leads have been omitted from the drawing and are understood to be provided in known manner. Other forms of motor may of course be substituted, if required for the hysteresis motor.

The gimbal structure 4 is itself supported within an outer fluid-tight casing 9 by two coaxial supports 10 which extend outwards from opposite ends of the structure, the axis 11 of the two supports 10 intersecting the spin axis 3 of the gyroscope rotor 2 at right angles at the center of mass of the gimbal structure 4 and the motor 1 (this support axis 11 constitutes the first axis of the gyroscope referred to in the general statements above and will now be referred to as such in this description). Each support 10 is clamped (the actual clamps are omitted in the drawings) at its outer end to part of the outer casing 9 and includes a thin torsion bar 12, for example of high tensile steel or beryllium copper, to enable the gimbal structure to rotate as a whole about the first axis 11 under the restraint imposed by the torsional elasticity of the torsion bars 12. Each support 10, also includes at a point immediately nearer to the inner casing than the torsion bar, a circular cylindrical part 13 which is effectively an extension of the gimbal structure and is encircled by the inner surface of a conventional cylindrical ball-bearing 14. The inner surfaces of the ball-bearings 14 have a radius which is from 0.0005 to 0.003 inch greater than the radius of the parts 13 of the supports 10 which they surround as indicated at 22. The ball-bearings 14 are themselves suitably supported by parts 15 and 16 of the casing 9.

One of the supports 10, that shown on the right in FIGURE 1, also carries, at a point lying between the torsion bar 12 and the gimbal structure 4, the moving part 17 of a pick-off, e.g. an electromagnetic transducer, arranged to generate an electrical signal proportional to any rotation of the structure 4 about the first axis 11 relative to the outer casing 9. The fixed part 18 of the pick-off is supported by the part 16 of the casing 9.

The two supports 10 do not normally have to support the full weight of the gimbal structure 4 and the gyroscope motor 1 as the space inside the outer casing 9 is filled with a fluid, such as a so-called "silicone fluid," which is selected to have as low a viscosity/temperature variation as possible. The density may for example be of the order of 0.97 in the case of a silicone fluid. Suitable seals and other arrangements are incorporated in the casing 9 to prevent leakage of this fluid, glands being provided as required for the electrical leads to the motor 1 and the pick-off.

In use, as with known rate gyroscopes, the gyroscope described is mounted with its outer casing 9 secured to some body of which it is required to measure the rate of rotation about a given axis. The gyroscope is mounted with its second axis 30, that is the axis of the gyroscope passing through the centre of mass of the gimbal structure 4 and the motor 1 normal to both the spin axis 3 and the first axis 11, co-incident with the given axis of the body. Any rotation of the body about its given axis will then cause the gyroscope to precess about the first axis through an angle proportional to the rate of rotation of the body about the given axis, an output signal proportional to the angle of precession of the gyroscope and thus to the rate of rotation of the body being generated by the pick-off 17, 18.

The provision of the ball-bearings 14 the inner surfaces of which are spaced as at 22 from the parts 13 of the supports 10 which they surround, enables the torsion bars 12 to be of comparatively small lateral stiffness. Contact of the support parts 13 with the inner surfaces of the bearings 14 will prevent undue lateral motion of the gimbal structure 4 relative to the outer casing 9 such as may be caused for example by abnormal lateral accelerations of the gyroscope either in operation or for example during transit. As the bearings 14 will, however, permit rotation of the support parts 13 relative to the parts 15 and 16 supporting the ball-bearings 14, any precession of the gyroscope taking place when contact occurs can continue although there will of course be some additional restraint on the precessional rotation due to friction in the bearings 14. Since lateral and torsional stiffness of a torsion bar are closely associated, it will be appreciated that this arrangement enables torsion bars of small torsional stiffness to be used in the supports, thus allowing the construction of gyroscopes which are sensitive to very small rates of rotation (e.g. 0.005°/second or less) about the second axis 30 but which are also able to measure rates of rotation up to a few degrees per second (e.g. 6° per second). The torsion bars 12 must of course be capable of supporting that part of the weight of the gimbal structure and the gyroscope motor which is not supported by the up-thrust of the liquid in order that the surfaces of the bearings are not in contact with the support parts in the absence of a lateral acceleration. When any lateral deflection of the supports 10 is sufficient to cause contact with the bearing surfaces, the output signals generated will not be such an accurate representation of the rate of rotation of the body on which the gyroscope is mounted, as it is in the absence of contact. However the present invention does enable rate gyroscopes to be constructed which can be made sufficiently sensitive to provide an output signal representative of small rates of rotation in all circumstances, the output being properly proportional to the rate of rotation in the absence of lateral deflection sufficient to cause contact with the bearing or bearings.

Such a rate gyroscope is particularly suitable for use in aircraft instruments where accelerations in flight are normally of a relatively low order (say less than 3g) but where occasional peak accelerations (up to say 10g) may occur during certain manoeuvers and where, prior to its installation, the gyroscope may be subjected in transit to shocks (up to say 50g) in excess of those normally experienced in flight. Another example of the possible use of such gyroscopes is in missile applications where advantage will be found in the reduction of zero errors which normally result from relative motion between the gimbal and the frame when the gyroscope is in accelerated flight.

Figure 2:
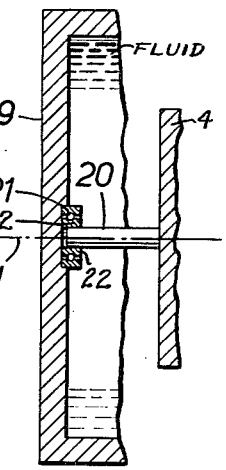
FIGURE 2 shows an alternative construction of part of FIGURE 1.
Figure 2A:
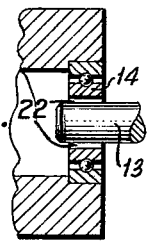
FIGURES 2A and 2B are enlarged fragmentary sections showing the spacing between the torsion bars and corresponding bearings.

It will be appreciated that a torsion bar may be provided at one end only of the gimbal structure 4, the other end being supported by a rigid shaft 20 supported by a ball-bearing 21 as shown in FIGURE 2 which shows the relevant parts of this alternative construction. In addition, the torsion bars 12 may be replaced by other forms of restraining spring supports, for example, leaf spring supports.

Figure 3:
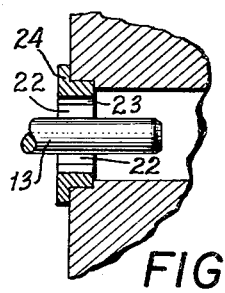
FIGURE 3 is a fragmentary sectional view of a modified form.
Figure 2B:
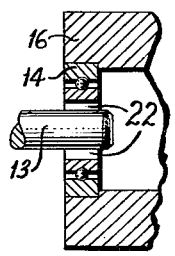

The ball bearings 14 may be replaced by other forms of bearing provided that the frictional losses on contact do not increase the inaccuracy of the output signals from the gyroscope to too great an extent. For example, a journal bearing 24 lined with polytetrafluorethylene 23 may be employed as shown in FIGURE 3 containing bearing 24, the immediate portions of the part 16 supporting it and the part 13 which it surrounds.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

What I claim is:

1. A rate gyroscope comprising a casing, a gimbal structure, means for rotatably mounting said gimbal structure about a first axis within the casing, a gyroscope motor supported by the gimbal structure and having a rotor, means for rotatably mounting said rotor about a spin axis at right angles to said first axis, and a body of liquid within said casing for partially supporting the weight of the gimbal structure and the gyroscope motor, said gimbal structure mounting means including: spring means operatively connected between said casing and said gimbal structure, said spring means normally urging said gimbal structure to a predetermined rotational position about said first axis, said spring means also supporting a part of the weight of the gimbal structure and the gyroscope motor, a part connected to and rotating with the gimbal structure about said first axis and having a surface which has circular symmetry about the first axis, and a low friction bearing which is supported by the casing and surrounds said surface but is spaced from it, the spacing of the bearing from said surface being such as to prevent excessive motion of the gimbal structure relative to the casing in directions normal to the first axis.

2. A rate gyroscope comprising a casing, a gimbal structure, a pair of torsion bars for supporting the gimbal structure for rotation within the casing about a first axis and at the same time exerting a restraining torque acting against such rotation, the torsion bars supporting the gimbal structure at opposite ends and themselves each having one end secured to the casing and the other end to the gimbal structure, a gyroscope motor supported by the gimbal structure and having a rotor mounted for rotation about a spin axis at right angles to said first axis, a body of liquid within the casing partially supporting the weight of the gimbal structure and the gyroscope motor, a pair of parts each connected to and rotating with the gimbal structure about said first axis, each of said parts having a surface which has circular symmetry about the first axis and each being situated close to the point of attachment of the gimbal structure to a respective one of the two torsion bars, and a pair of low friction bearings which are both supported by the casing, each said bearing surrounding, but being spaced from, the said surface of a respective one of said pair of parts, the spacing being such as to prevent excessive motion of the gimbal structure relative to the casing in directions normal to the first axis.

3. A rate gyroscope comprising a casing, a gimbal structure mounted for rotation about a first axis within the casing, a torsion bar and a rigid shaft having axes coincident with the first axis and supporting the gimbal structure at opposite ends, the torsion bar having one end secured to the casing and the other to the gimbal structure and serving to exert a restraining torque on the gimbal structure acting against rotation about the first axis while the rigid shaft has one end secured to the gimbal structure and the other supported by the casing but free to rotate with respect thereto, a gyroscope motor supported by the gimbal structure and having a rotor mounted for rotation about a spin axis at right angles to said first axis, a body of liquid within the casing partially supporting the weight of the gimbal structure and the gyroscope motor, a part connected to and rotating with the gimbal structure about said first axis, said part being situated close to the point of attachment of the gimbal structure to the torsion bar and having a surface which has circular symmetry about the first axis, and a low friction bearing which is supported by the casing and surrounds said surface but is spaced from it, the spacing being such as to prevent excessive motion of the gimbal structure relative to the casing in directions normal to the first axis.

4. In a rate gyroscope, a casing, a gimbal structure mounted within said casing, means connected between said casing and said gimbal structure for mounting said gimbal structure rotatably about an axis, said gimbal structure mounting means including: spring means rigidly coupled to both said gimbal structure and said casing for normally urging said gimbal structure to a predetermined rotational position about said axis, a part connected to and rotating with the gimbal structure about said first axis and having a surface which has circular symmetry about said first axis, and a low friction bearing connected to said casing and surrounding but spaced from said surface of said part.

5. A rate gyroscope comprising a casing, a gimbal structure, means for rotatably mounting said gimbal structure about a first axis within the casing, a gyroscope motor supported by the gimbal structure and having a rotor, means for rotatably mounting said rotor about a spin axis at right angles to said first axis, and fluid damping means for damping rotational motion of said gimbal structure about said first axis, said gimbal structure mounting means including: spring means operatively connected between said casing and said gimbal structure, said spring means normally urging said gimbal structure to a predetermined rotational position about said first axis in the absence of precessional rotation of said gimbal structure about said first axis, said spring means also supporting a part of the weight of the gimbal structure and the gyroscope motor, a part connected to and rotating with the gimbal structure about said first axis and having a surface which has circular symmetry about the first axis, and a low friction bearing which is supported by the casing and surrounds said surface but is spaced from it, the spacing of the bearing from said surface being such as to prevent excessive motion of the gimbal structure relative to the casing in directions normal to the first axis.

6. A rate gyroscope according to claim 5 wherein said spacing lies within the range of 0.0005 to 0.003 inch.

7. A rate gyroscope comprising a casing, a gimbal structure, a pair of torsion bars for supporting the gimbal structure for rotation within the casing about a first axis and at the same time exerting a restraining torque acting against such rotation, the torsion bars supporting the gimbal structure at opposite ends and themselves each having one end secured to the casing and the other end to the gimbal structure, a gyroscope motor supported by the gimbal structure and having a rotor mounted for rotation about a spin axis at right angles to said first axis, fluid damping means for damping rotational motion of said gimbal structure about said first axis, a pair of parts each connected to and rotating with the gimbal structure about said first axis, each of said parts having a surface which has circular symmetry about the first axis and each being situated close to the point of attachment of the gimbal structure to a respective one of the two torsion bars, and a pair of low friction bearings which are both supported by the casing, each said bearing surrounding, but being spaced from, the said surface of a respective one of said pair of parts, the spacing being such as to prevent excessive motion of the gimbal structure relative to the casing in directions normal to the first axis.

8. A rate gyroscope comprising a casing, a gimbal structure mounted for rotation about a first axis within the casing, a torsion bar and a rigid shaft having axes coincident with the first axis and supporting the gimbal structure at opposite ends, the torsion bar having one end secured to the casing and the other to the gimbal structure and serving to exert a restraining torque on the gimbal structure acting against rotation about the first axis while the rigid shaft has one end secured to the gimbal structure and the other supported by the casing but free to rotate with respect thereto, a gyroscope motor supported by the gimbal structure and having a rotor mounted for rotation about a spin axis at right angles to said first axis, fluid damping means for damping rotational motion of said gimbal structure about said first axis, a part connected to and rotating with the gimbal structure about said first axis, said part being situated close to the point of attachment of the gimbal structure to the torsion bar and having a surface which has circular symmetry about the first axis, and a low friction bearing which is supported by the casing and surrounds said surface but is spaced from it, the spacing being such as to prevent excessive motion of the gimbal structure relative to the casing in directions normal to the first axis.

References Cited by the Examiner
UNITED STATES PATENTS

| | | | |
|---|---|---|---|
| 2,620,668 | 12/52 | Lundberg | 74—5 |
| 2,666,677 | 1/54 | Miller. | |
| 2,672,054 | 3/54 | Warren et al. | 74—5.5 |
| 2,851,886 | 9/58 | Kuipers | 74—5.5 |
| 2,893,247 | 7/59 | Stern | 74—5.6 |
| 2,945,380 | 7/60 | Pope et al. | 74—5 |
| 2,955,472 | 10/60 | Krupick et al. | 74—5 X |
| 3,009,360 | 11/61 | Morsewich | 74—5 |

BROUGHTON G. DURHAM, *Primary Examiner.*